US006257078B1

(12) United States Patent
Vencill (10) Patent No.: US 6,257,078 B1
(45) Date of Patent: Jul. 10, 2001

(54) BEARING ADJUSTMENT AND MONITORING SYSTEM

(76) Inventor: R. Lee Vencill, P.O. Box 63, Williams, OR (US) 97544

( * ) Notice: Subject to any disclaimer, the term of this patent is extended or adjusted under 35 U.S.C. 154(b) by 0 days.

(21) Appl. No.: 09/330,535

(22) Filed: Jun. 11, 1999

Related U.S. Application Data (60) Provisional application No. 60/089,363, filed on Jun. 15, 1998.

(51) Int. Cl.$^7$ .............................. F16C 25/06; F16C 41/04; G01B 121/20; G01B 5/14; G01M 13/04
(52) U.S. Cl. ............................. 73/865.9; 33/517; 384/260
(58) Field of Search ............................. 73/865.9; 33/517; 384/260

(56) References Cited

U.S. PATENT DOCUMENTS

| | | | | |
|---|---|---|---|---|
| 3,979,968 | * | 9/1976 | Cecchari | 74/498 |
| 4,372,625 | * | 2/1983 | Petros | 73/865.9 X |
| 4,812,094 | * | 3/1989 | Gruse | 411/134 |
| 5,105,554 | * | 4/1992 | Schnyder et al. | 33/783 |
| 5,490,432 | * | 2/1996 | Allard et al. | 73/865.9 |
| 5,778,553 | * | 7/1998 | Hollansbe | 33/810 |
| 5,856,624 | * | 1/1999 | Elsins | 73/865.9 |
| 6,058,767 | * | 5/2000 | Calvin | 73/865.9 X |

FOREIGN PATENT DOCUMENTS

469651 A1 * 2/1992 (EP) .............................. F16C/25/06

* cited by examiner

Primary Examiner—Thomas P. Noland
(74) Attorney, Agent, or Firm—Olson and Olson

(57) ABSTRACT

A bearing adjustment and monitoring system is provided for a bearing mounted between a hub and a spindle, one of which is rotatable relative to the other and one of which has a threaded end section with traversing keyway and the other of which has an abutment for limiting inward movement of the bearing. A backing washer member is arranged to removably abut the bearing on the end opposite the abutment and has a key extending into the keyway to secure it against rotation, and a calibrated nut member has threads configured for threading onto the threaded end section. One of the backing washer member and calibrated nut member has a plurality of circumferentially spaced openings and the other of the backing washer member and calibrated nut member has a plurality of openings registering with the openings in the one member but spaced apart differently therefrom, whereby to provide vernier adjustment of rotation of the calibrated nut member. A lock removably secures the backing washer member and calibrated nut member together, and a measuring device operatively interengages the hub and spindle for measuring the relative movement between them for adjusting the axial end play between the hub and spindle.

18 Claims, 11 Drawing Sheets

BEARING ADJUSTMENT AND MONITORING SYSTEM

This application claims the benefit of Provisional application Ser. No. 60/089,363, filed Jun. 15, 1998.

BACKGROUND OF THE INVENTION

This invention relates to new and useful improvements in bearing axial free play measurement and adjustment and is particularly suitable for spindle-mounted tapered roller wheel bearings.

Precision adjustment of wheel bearing free axial end play, particularly of truck, trailer and bus wheel hubs is very difficult and time consuming. So difficult that precise adjustment is seldom attained, because adjustment typically is attempted by feel or experienced guess.

It is generally recognized by those in the industry that adjustment of tapered roller wheel bearings, such as those used in wheel hubs on trucks, trailers, buses, etc., is a major consideration in preventing excessive wheel end component wear and early wheel end component failure, including catastrophic wheel loss. Wheel bearing axial end play setting effects bearing life and the usable service life of seals, brakes and tires.

It is generally acknowledged in heavy duty, over-the-road equipment that the ideal method of bearing adjustment is to utilize a dial indicator to determine the point of zero axial end play, and then to preload the bearing as much as 0.001 inch and no more, to obtain optimum bearing life. Prior art devices have rendered this a trial and error task, very time consuming, and often impossible outside the test laboratory. In practice, the time consuming trial and error method with a dial indicator is rarely used.

Excessive bearing preload rapidly destroys the bearings. Consequently, the industry has grown to accept 0.001 to 0.020 inch end play as tolerable, and 0.001 to 0.005 inch as preferred, providing it can be verified. In practice, verification using a dial indicator is rarely performed because of the difficulty and the incompatability of parts, tools and procedures. Because optimum bearing adjustment is so difficult and bearing failure is so costly, a portion of the transportation industry is experimenting with expensive, finely machined and pre-assembled hubs in the hope of reducing operational wheel end expenses.

The prior art in threaded wheel bearing retaining devices is separated into three types: double nut devices with either the inner or outer nut jammed against the other, which changes the adjustment; single nut devices; and single or double nuts highly torqued to retain a pre-assembled hub and bearing unit. These prior devices are secured from further rotation by bendable tabs, peening, set screws, threaded locking fluids, keyed circular clips, spring loaded locking mechanisms, or friction. The commonly practiced prior art methods of setting axial end play are torque, torque and back off or by feel. In each case the unsure mechanic, lacking a precision device and method, can only hope for success.

U.S. Pat. No. 4,812,094 is typical of prior art single nut devices. In this patent, the device requires fitting a socket tool over the nut, resulting in release of the locking tab so that the nut may be rotated freely while the tool is affixed. Accordingly, fine increments of rotation cannot be indexed. This procedure further inhibits the simultaneous use of a dial indicator, whereby determining the exact zero point of axial end play is very difficult, if not impossible. The device is capable only of very coarse, 150 adjustment increments, and the process of initially removing the nut socket incurs the risk of unintentional rotation of the unpinned nut.

Prior art methods are extremely friction sensitive. Thread tolerance, cut, irregularity, damage, contamination and many other variables affecting the friction in on-vehicle tapered roller wheel bearing adjustment, and each individual assembly is unique in its variation. Devices dependent upon torque averaging technique inherently set excessive axial end play on those assemblies having higher than the mean average friction. On a low friction assembly, using a torque technique excessively preloads and destroys the bearings. Prior methods are dependent on a severe surface lubricant to provide a broader, forgiving tolerance of the permissible mean adjustment range. This compromise in lack of precision, is costly.

The prior art provides no means to either monitor or readily measure wheel bearing axial clearance without partial disassembly. Improper adjustment of over-the-road equipment frequently leads to a bearing failure that may be detected audibly, by smoking brakes, by oil seal failure, by irregular tire wear, or by wheel end separation.

SUMMARY OF THE INVENTION

In its basic concept, the bearing adjustment and monitoring system of this invention utilizes a spindle nut and keyed backing washer, both of which have cooperating vernier openings and an interengageable lock pin to secure the nut in adjusted position of rotation, to provide precise bearing preload adjustment. A wheel end hub mounted status sensor electrically communicates with a fixed spindle mounted stator to enable real time and motion analysis of wheel end structure and hub components, inclusive of bearing preload data, and remotely communicates with a hand held reader or an equipment mounted warning monitor.

It is the principal objective of this invention to provide a bearing adjustment and monitoring system which overcomes the aforementioned limitations and disadvantages of prior art systems.

Another objective of this invention is to provide a bearing adjustment and monitoring system of the class described that requires no disassembly of the wheel bearing assembly.

Another objective of this invention is the provision of a bearing adjustment and monitoring system of the class described that significantly reduces vehicle operational and maintenance expenses, to achieve the maximum possible wheel end component life.

Still another objective of this invention is to provide a bearing adjustment and monitoring system of the class described that reduces the risk of catastrophic failure by obtaining precise initial wheel bearing adjustment, wheel bearing monitoring and precise readjustment.

Another objective of this invention is the provision of a bearing adjustment and monitoring system of the class described that produces performance data that instantly signals the vehicle operator of impending failure data.

A further objective of this invention is the provision of a bearing adjustment and monitoring system of the class described that permits simultaneous use of a torque tool to "feel" and a dial indicator to "see", the exact point of zero axial end clearance, irrespective of other unknown variances caused by the weight, type or size of mounted wheels and tires and component friction variances.

A still further objective of this invention is to provide a bearing adjustment and monitoring system of the class described that measures and monitors the axial preload of the bearings, to reset the preload if required, and to simplify this preventative maintenance task.

Still another objective of this invention is the provision of a wheel adjustment and monitoring system of the class described that affords real time monitoring of the wheel end status.

The foregoing and other objects and advantages of this invention will appear from the following detailed description, taken in connection with the accompanying drawings of preferred embodiments.

DESCRIPTION OF THE PREFERRED EMBODIMENTS

Figure 1:
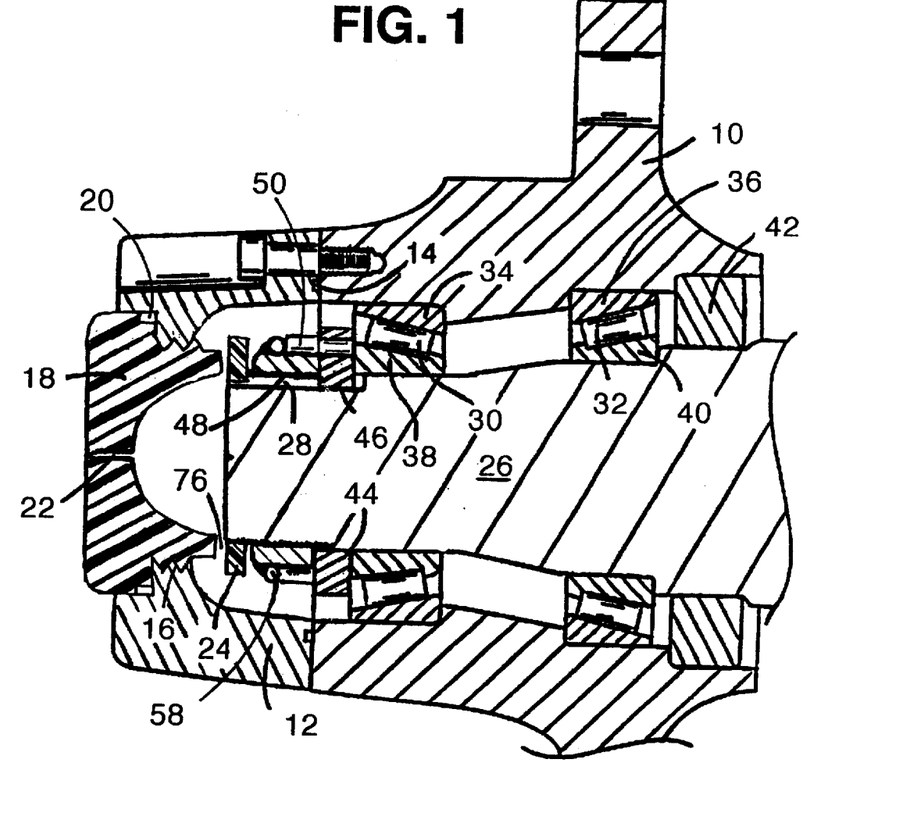
FIG. 1 is a fragmentary longitudinal sectional view of a hub and spindle assembly in association with a wheel bearing adjustment and monitoring system embodying the features of this invention.

FIG. 1 illustrates the working form of a first embodiment of the present bearing adjustment and monitoring system of this invention, fitted to a tapered roller bearing spindle-mounted hub, as in a heavy duty trailer application. It comprises hub 10 having an outer end cap 12 with an O-ring seal 14 therebetween. The outer end of cap 12 has an opening 16 for removably receiving an electronic status sensor 18 with O-ring seal 20 in the opening. Sensor 18 has the usual small axial ventilating port 22 and is associated with sensor stator ring 24 secured to the outer end of spindle 26 which is provided with the usual keyway 28 recessed in the upper threaded portion of the spindle.

The hub encloses the usual outer and inner wheel bearings 30 and 12, respectively, and includes the usual outer bearing races 34 and 36 fitted in the hub. Also shown is the usual inner races 38 and 40, the inner bore of the usual outer wheel bearing inner race 38 being closely fitted to but easily movable lengthwise on spindle 26. Also shown is the usual inner lubricant seal 42.

A keyed inverse vernier backing washer 44, the inner face of which is perpendicular to the spindle axes, communicates with the outer face of the usual outer bearing inner race 38. The key 46 of the backing washer fits into the spindle keyway 28 to prevent the backing washer from turning. The inner face of specialized and calibrated nut 48, threaded in its inner bore to turn upon the outer threaded portion of spindle 26, communicates with the outer face of the keyed backing washer 44.

Figure 2:
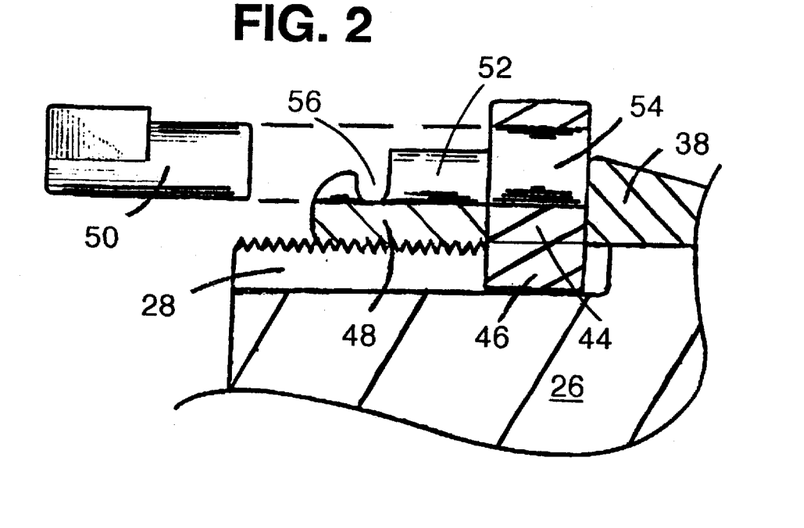
FIG. 2 is a fragmentary sectional view, on an enlarged scale, of the calibrated nut area of FIG. 1.

With reference also to FIG. 2, the calibrated nut 48 is secured from rotation by means of lock pin 50 which communicates both with opening 52 in the circumference of nut 48 and with opening 54 through the upper circumferential body of keyed backing washer 44. Locking pin openings 52 and 54 are in axial alignment with each other to receive lock pin 50. The circumferential spacing between the openings 52 is different from the circumferential spacing between openings 54, whereby to provide a vernier adjustment of rotation of calibrated nut 48, described hereinafter.

The inner lengthwise portion of lock pin 50 fitting in the keyed backing washer opening 54 is of smaller cross section than the outer portion of the lock pin fitting in calibrated nut locking pin opening 52, whereby the lock pin cannot advance further through opening 54 in an inner direction and interfere with outer bearing 30. The specialized calibrated nut 48 has a circumferential groove 56 about its outer circumference and receives a circular spring retaining ring 58 (FIG. 1) to trap lock pin 50 in place.

Figure 3:
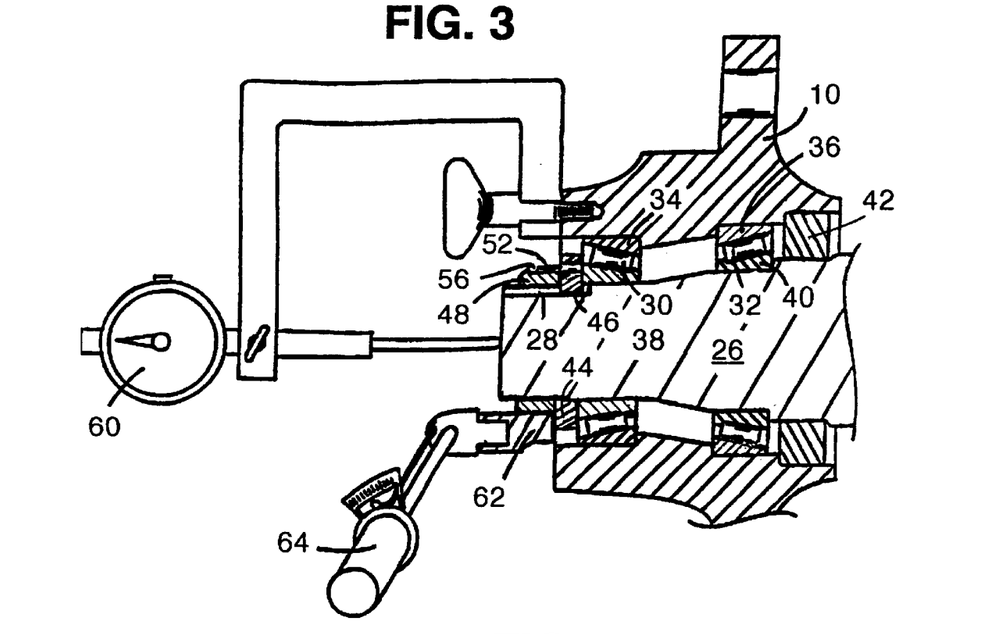
FIG. 3 is a fragmentary longitudinal sectional view, similar to FIG. 1, illustrating the adjustment procedure of the invention.

The operation of the assembly of FIG. 1 is illustrated in FIG. 3. With the inner bearing outer race 36 and outer bearing outer race 34 properly seated in hub 10 and the lightly lubricated inner and outer taper roller bearings 32 and 30, respectively, and the usual inner lubricant seal 42 properly fitted in the hub, and the assembled hub placed on a lightly lubricated spindle 26, the present wheel bearing adjustment procedure is as follows: Keyed backing washer 44 is placed on the spindle 26 and calibrated nut 48 is hand threaded onto the spindle until the nut approaches hand tight, and is in contact with keyed backing washer 44. This washer is in contact with the outer wheel bearing inner race 38, whereupon inward travel of nut 48 causes the same inward travel of keyed backing washer 44 and in turn causes the same inward travel of the outer wheel bearing inner race 38. A precision measuring instrument 60, such as a dial indicator, is fixed to hub 10 so that axial movement of the hub on spindle 26 may be easily measured in thousandths of an inch.

Figure 4:
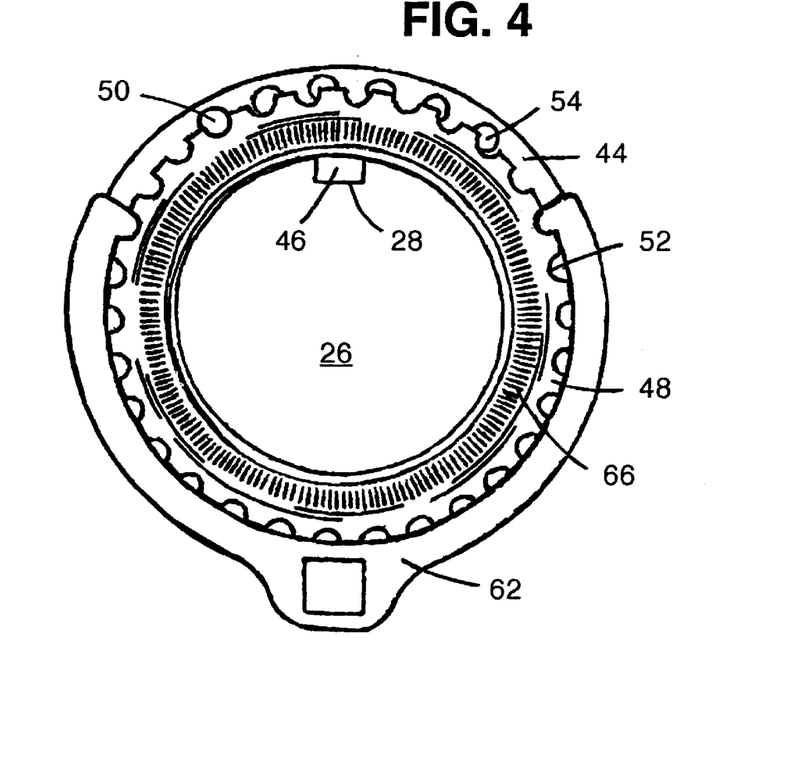
FIG. 4 is a front elevation, on an enlarged scale, showing the backing washer and calibrated nut during an adjustment procedure.
Figure 5:
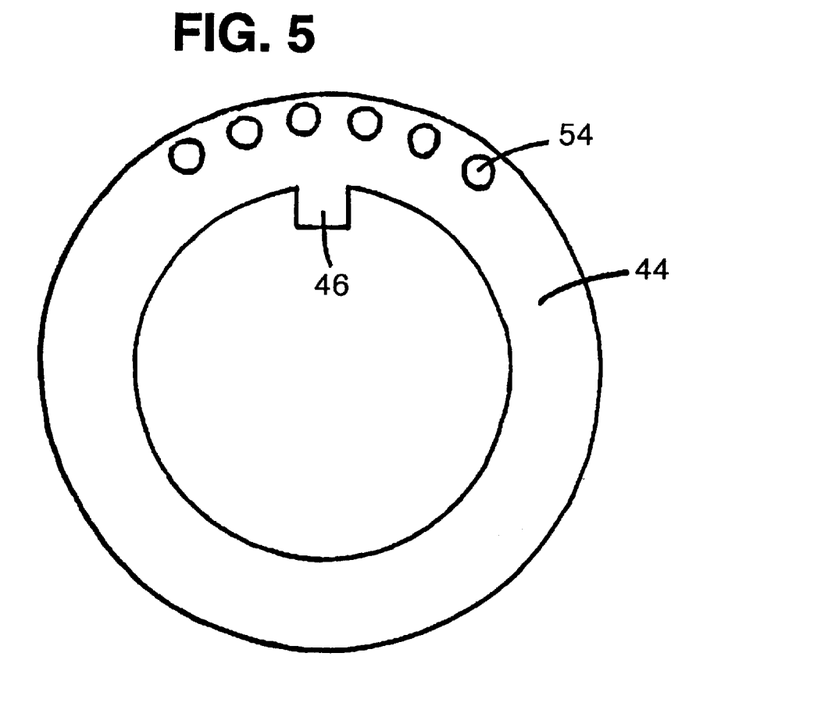
FIG. 5 is a front elevation, on an enlarged scale, of the keyed backing washer of FIG. 1.
Figure 6:
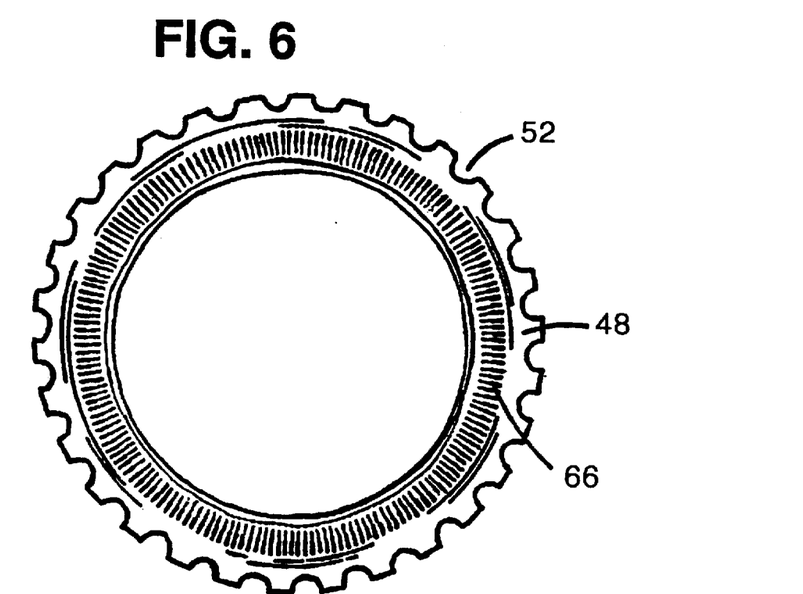
FIG. 6 is a front elevation, on an enlarged scale, of the calibrated nut of FIG. 1.

The zero point of axial end play is next determined. A usual torque wrench is used to measure rotational resistance in turning nut 48. A nut drive tool 62 is of the open design of a spanner wrench, permitting the use of a measuring instrument such as dial indicator 60, and simultaneous use of a torque measuring tool 64. Referring to FIG. 4, there is shown in front elevation the spindle 26, keyed inverse vernier backing washer 44, calibrated nut 48 and nut drive tool 62. This illustrates the open and accessible configuration for the adjustment. The dial indicator 60 (FIG. 3) is observed as calibrated nut 48 is rotated. This method is not torque sensitive, so the torque reading itself is not critical although variances in torque caused by assembly, thread, dimensional or bearing wear irregularities, immediately become apparent. In normal adjustment, as the nut 48 is turned the dial indicator 60 records the corresponding inward travel of the hub 10 in axial relationship to the spindle 26. The spot at which hub movement stops and further rotation of the nut 48 requires an immediate increase in torque, is the point of zero axial end play. Should the hub continue to move with increasing torque, once an apparent zero point is reached, the nut 48 should be backed off slightly, the hub rotated and the procedure repeated. This is an excellent quality control method for determining wear or assembly irregularities.

With the axial end play zero point determined, lock pin openings 52 in nut 48 and lock pin openings 54 in keyed backing washer 44 are integrally sequenced to provide equal adjustment increments per uniform degree of rotation. In this example, nut 48 has 30 lock pin openings 52 and keyed backing washer 44 has six lock pin openings 54 sequenced as an inverse vernier in correspondence to calibrated nut 48. This provides 180 adjustment increments per one revolution. To adjust axial preload to a specification of one thousandths of an inch preload maximum, on a spindle having 16 threads per inch, nut 48 is turned an additional three adjustment increments, which is 6°. One inch divided by 16 turns per inch equals 0.0625 inch per one full revolution. Having 180 adjustment increments per revolution in this illustration, each adjustment increment is 0.00035 inch (0.0625 inch divided by 180 increments).

With reference again to FIG. 4, the specialized nut 48 may have radial or circumferential incremental scribes 66 on its outer face adjacent the spindle 26. Utilizing one side of spindle keyway 28 as a reference, calibrated nut 48 is tightened three scribe marks to obtain 0.001 inch preload, or backed off to obtain axial end clearance. Lock pin 50 now is installed in openings 52 and 54, drive nut tool 62 is removed and circular spring retaining ring 58 is easily pushed by hand onto the conical outer face of nut 48 until it snaps into retaining groove 56, securely trapping lock pin 50 in place.

The initial tapered roller wheel bearing axial end play adjustments having thus been made and dial indicator 60 removed from hub 10, reference again is made to FIG. 1. Sensor stator ring 24 is pushed or threaded onto the outer threaded end of spindle 26 until the stator ring 24 is flush with the outer face of the spindle. O-ring sealed end cap 12 next is fixed to hub 10 and O-ring sealed electronic status sensor 18 is threaded or twist-lock fitted into end cap 12 after the hub is properly lubricated.

Figures 7, 8:
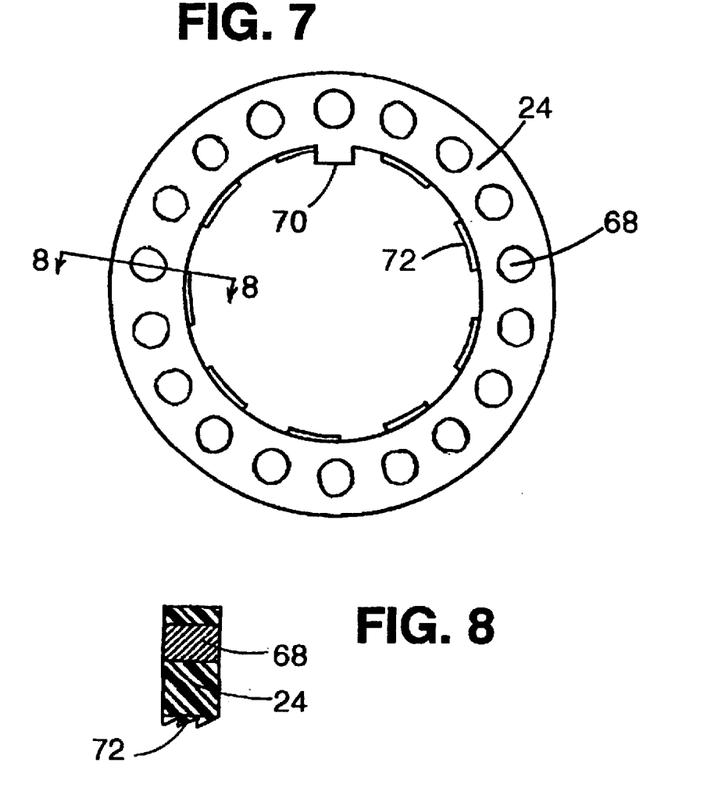
FIG. 7 is a front elevation, on an enlarged scale, of the keyed sensor status ring of FIG. 1.
FIG. 8 is a sectional view taken on the line 8—8 in FIG. 7.
Figure 9:
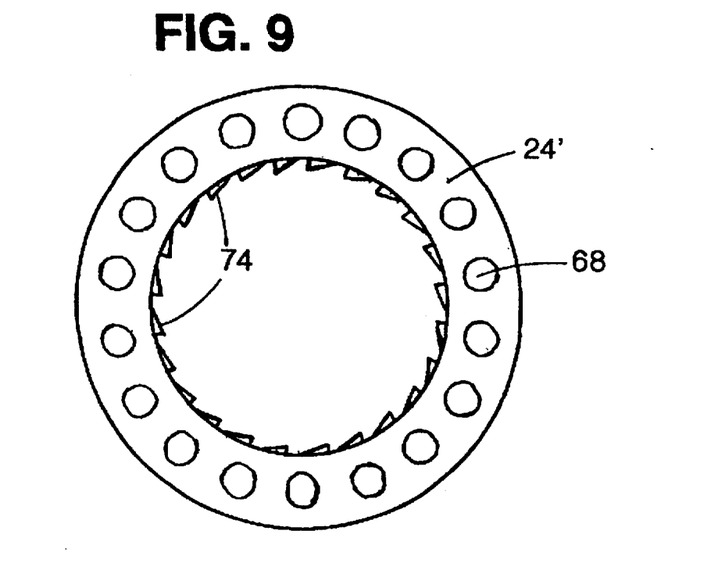
FIG. 9 is a front elevation, on an enlarged scale, of a self locking threaded sensor status ring.

Sensor stator ring 24 provides fixed magnetic poles 68 (FIGS. 7, 8 and 9) and is retained on the end of spindle 26. The structure of the stator body has a key 70 and elastically pliable threaded body fragments 72 (FIG. 7) or elastically pliable ratcheting type threaded wedge fragments 74 (FIG. 9), whereby the sensor stator rings 24 and 24' may be easily affixed to the spindle.

Hub-mounted wheel end status sensor 18 rotates with the hub 10, its innermost body being closely adjacent to stator 24 but separated by an air gap 76 (FIG. 1). Status sensor 18 contains electronic components and circuitry shown in FIG. 10: A dynamo 78 generates alternating current, rectifies the alternating current to direct current and powers a data processor 80 which functions as the sensor data processing brain. Battery 82 provides power for an internal timing clock 84 and power for programming and data transfer when stator sensor 18 is static. The charge on battery 82 is maintained and regulated by the dynamo.

Figure 10:
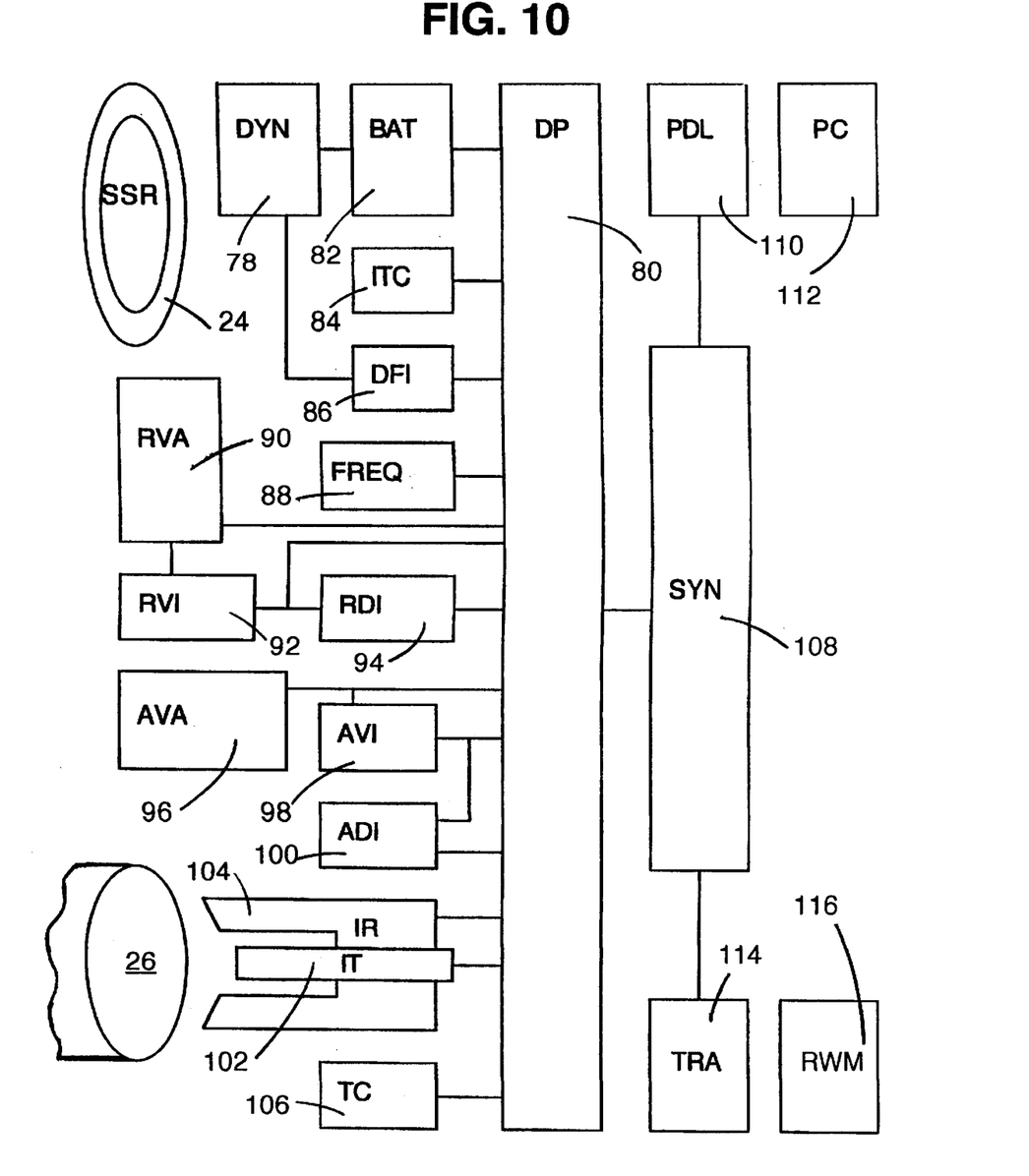
FIG. 10 is a block diagram of an electronic status sensor for use with the system of FIG. 1.

Dynamo field integrator 86 derives a signal from the wave form of the dynamo field winding and sends the signal to processor 80 to effectively measure rotational characteristics and air gap 76. Frequency counter 88 counts the dynamo field winding frequency for the processor, permitting the processor to compare rotational frequencies, such as bearing frequency and wheel mounting stud frequency. Timing device 84 provides the processor with a known reference standard and a data time stamp. Radial accelerometer 90 sends an acceleration signal to the data processor. Radial velocity integrator 92 is an operational amplifier integrating the accelerometer signal to obtain and send a velocity signal to the processor. Radial displacement integrator 94 is an operational amplifier integrating the velocity signal to obtain and send a displacement signal to the processor.

Axial accelerometer 96, being in a line parallel to the hub spindle axis, sends an axial acceleration signal to processor 80. Axial velocity integrator 98 derives the axial velocity signal for the processor and axial displacement integrator 100 derives the displacement signal for the processor. Internal transmitter 102 is powered by timed intermittent capacitive firing and the signal transmission is axially directed toward the outer end face of spindle 26. Internal receiver 104 receives and measures the reflected signal of transmitter 102 and sends a corresponding signal to the processor 80. Thermocouple 106 sends a millivolt signal to the processor.

The program data processor stores, assimilates, integrates, analyzes, interprets and compares signal patterns to predicted pre-programmed signals and to comparative data recorded signals, so that recognized and identified variations prompt responses which are sent to the programmable syntheziser 108 permitting logic analysis to eliminate internal or externally induced false signal responses. Proximity data link 110 remotely ties to a handheld reader or PC 112 so that data may be transferred during routine maintenance inspections. Transmitter 114 sends an emergency warning signal to in-cab warning monitor 116. Formatted data of vibration characteristics may be displayed, such as bearing preload or axial end clearance, bearing condition, lubricant performance, tire carcass condition, wheel end balance, corrective action advice, maximum speed, maximum temperature, loose brake pads or shoes, miles since last reset, and total mileage. The onboard warning system may indicate impending wheel end failure, such as bearing failure, excessive temperature, loose wheel fastenings, or tire failure which prompts corrective action, whereby to avert a possible catastrohic emergency.

Figure 11:
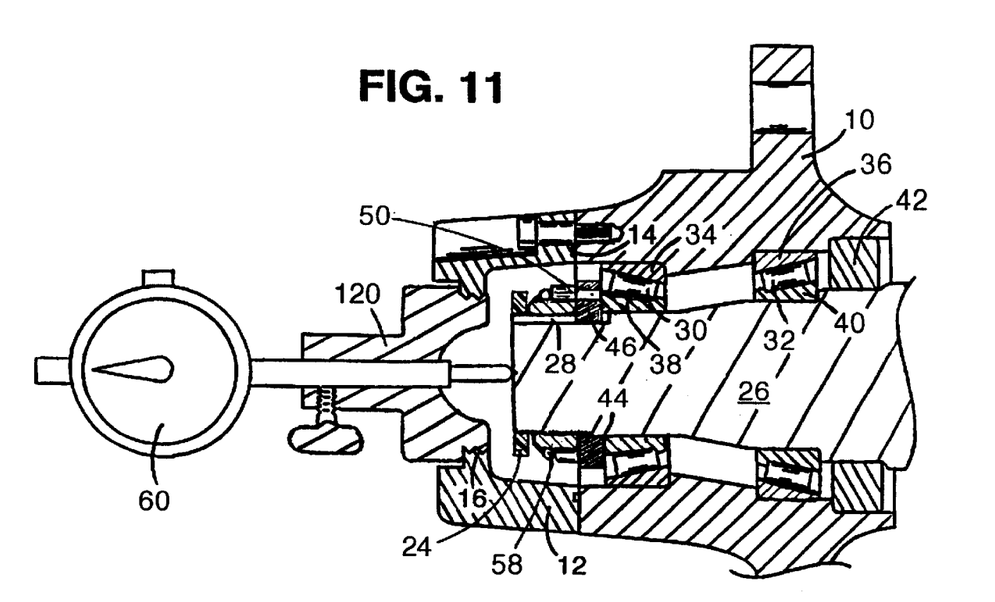
FIG. 11 is a fragmentary longitudinal sectional view, similar to FIG. 1, illustrating the inspection procedure without disassembly of the hub and spindle assembly.

To mechanically re-measure or verify axial preload during a preventative maintenance inspection, reference is made to FIG. 11. In a hub 10 fitted with either the electronic status sensor 18 (FIG. 1) or a vented end plug, the sensor or plug is removed and a dial indicator adapter 120 is fitted in end cap 12. With the corresponding vehicle wheel end jacked free of the ground surface and the wheel brake released, the wheel end unit may be rotated and pried in and out to determine axial end free play, as measured by dial indicator 60.

In the event bearing preload re-adjustment is required, the process is quick and easy: The exact free play in thousandths of an inch, obtained by the aforementioned full time electronic monitoring or by the dial indicator fitted in the hub end cap and the amount of preload desired being known, the end cap 12 is removed. Circular spring retaining ring 58 is removed and the nut drive tool 62 is fitted to the nut 48. The desired calibration scribe 66 is reference marked with a chalk or pen, lock pin 50 is removed, calibrated nut 48 is turned the desired increment and the lock pin is reinstalled. The preferred exact wheel bearing preload setting accordingly has been re-established, minimizing wheel end operational expense.

It is important to note that in the event adjustment is required in the field, without access to special tools, the zero point of axial end play may be easily approached by tightening calibrated nut 48 in 2° increments while rotating and wiggling hub 10. The near zero point of no bearing wiggle thereby is determined and the desired preload is set without fear of excessively preloading the bearings.

Figure 12:
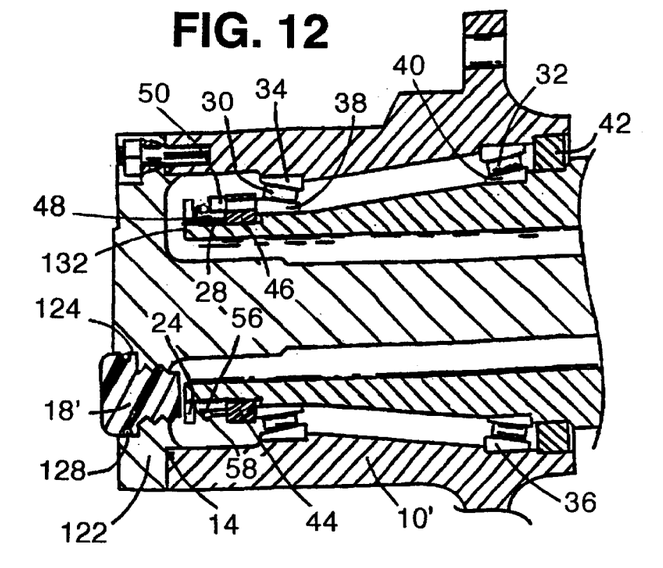
FIG. 12 is a fragmentary longitudinal sectional view of a hub and driven axle incorporating the bearing adjustment and monitoring system of this invention.
Figure 13:
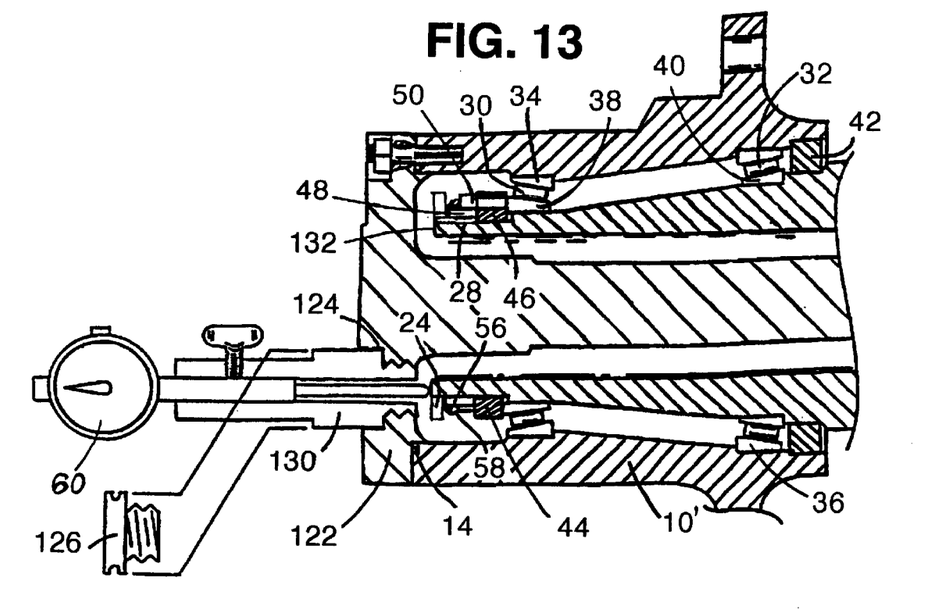
FIG. 13 is a fragmentary longitudinal sectional view of the hub and drive axle assembly of FIG. 12 incorporating an inspection system without disassembly of the components.

FIGS. 12 and 13 illustrates a drive axle configuration of this invention. Although the function and adjustment procedures are the same as in the non-driven hub, it is important to note that drive axle flange 122 becomes the outer end cap of hub 10. The drive axle flange contains a recessed port 124 for removably receiving either an O-ring sealed plug 126, O-ring seal 128, dial indicator adapter 130, or an O-ring sealed drive axle wheel end status sensor 18'. Recessed port 124 is centered over the outer rim face 132 of the tubular spindle so that sensor 18' is not axially centered, but orbits the circumference of sensor stator ring 24 as the hub rotates.

Figure 14:
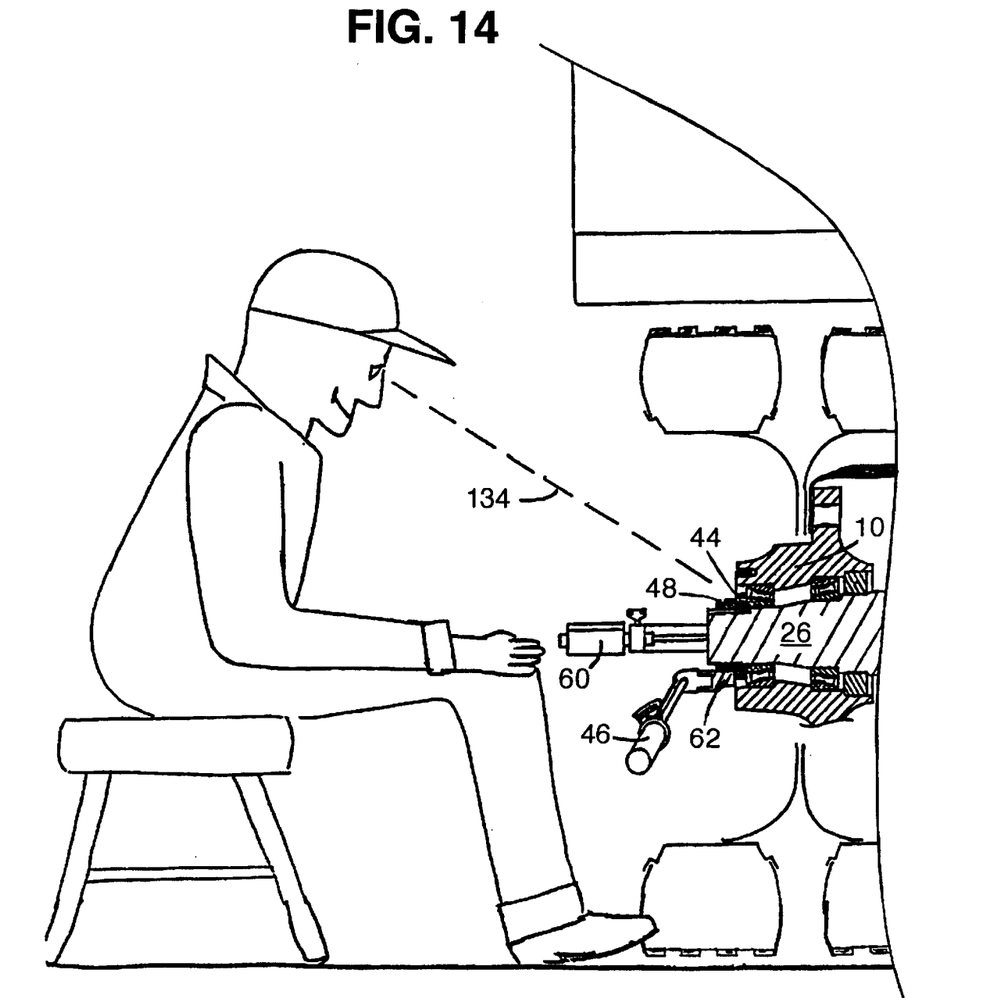
FIG. 14 is a fragmentary side elevation illustrating the manner of operating the bearing adjustment system of this invention.

FIG. 14 illustrates the unique ergonomic concept of this invention. A typical wheel end employed in the transportation industry is illustrated. The normal visual sight line 134 of the mechanic is cast downward onto the upper portion of the spindle 26, with the mechanic's hands positioned to the left and right of the spindle. The arrangement allows the unique and simple use of a dial indicator 60 and the simultaneous use of a torque tool 64. The inverse vernier locking pin positions of the keyed backing washer 44 (FIG. 4), the single specialized calibrated nut 48 and the unique open access of this integral combination keeps the entire adjustment procedure within the visual sight line. This assures equal favor of right or left-handed use, simplicity of operation and precision accuracy.

It is also important to note that major consideration is given to manufacturing cost. The lock pin openings 52 of calibrated nut 48, providing the "lugged" or "sprocket" circumferential appearance, the outer circumferential spring retaining groove 56 and the incremental scribes 66, are formed by an inexpensive manufacturing process.

Figure 15:
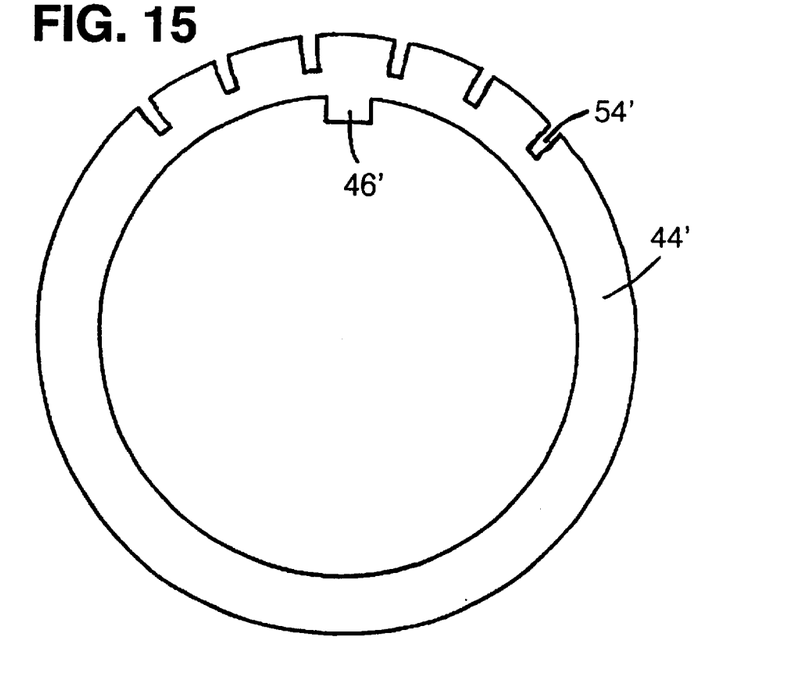
FIG. 15 is an enlarged front elevation of a modified form of keyed backing washer.
Figure 16:
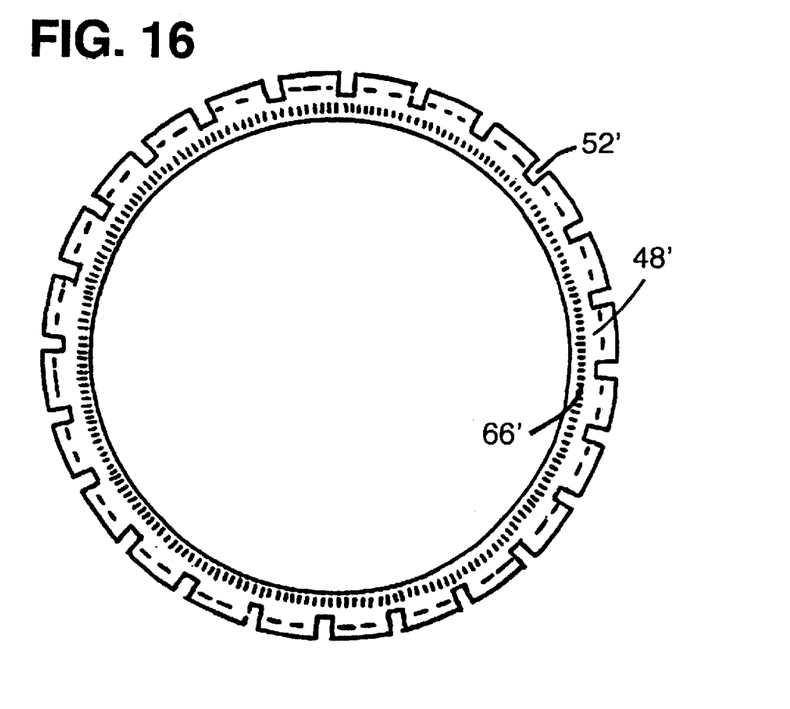
FIG. 16 is an enlarged front elevation of a modified form of calibrated nut for use with the backing washer of FIG. 15.

FIGS. 15 and 16 illustrate an alternative form of keyed backing washer 44' and calibrated nut 48'. The lock pin openings 52' and 54' may be less expensive to manufacture and may be of any dimension, and they may be interchangeable. Further, the sequencing of lock pin position openings, to achieve a desired inverse vernier, may be sequentially integrated to achieve ergonomic desirability.

Figure 17:
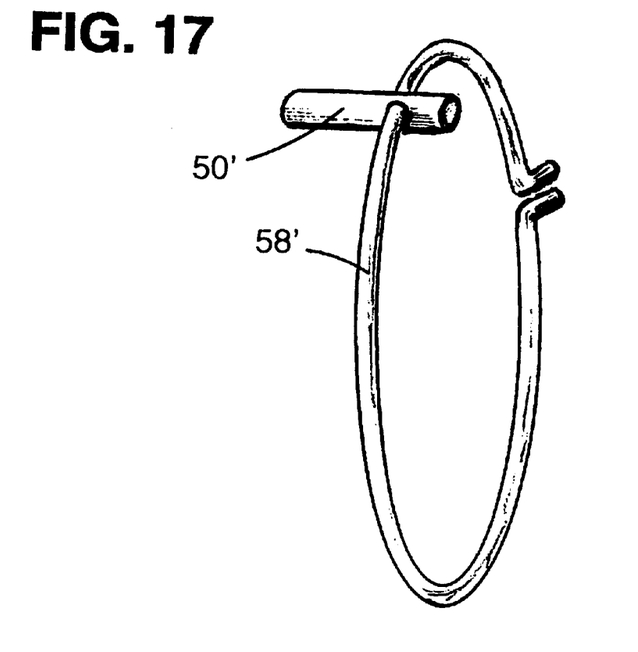
FIGS. 17 and 18 are perspective views of alternate forms of the spring retaining ring.
Figure 18:
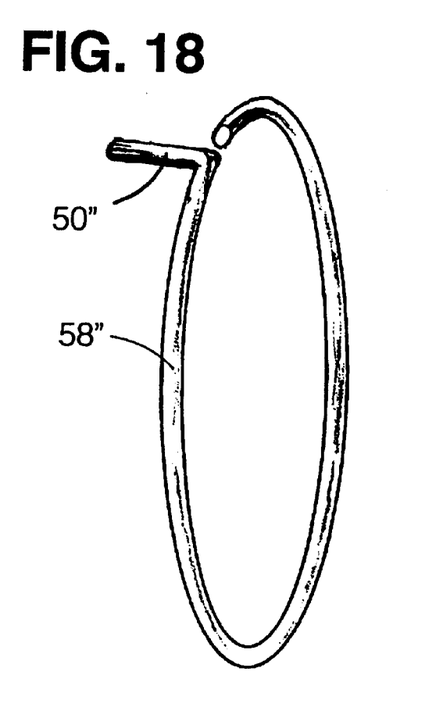

FIGS. 17 and 18 illustrate alternative constructions of the lock pin and spring retaining ring. In FIG. 17 the lock pin 50' is apertured to receive the retaining ring 58'. In FIG. 18 the lock pin 50" is integral with the retaining ring 58".

With reference to FIG. 1, in the bearing tightening and adjusting procedure, the outer bearing inner race 38 moves upon spindle 26. However, the arrangement may be reversed, wherein the inner or outer bearing race may adjustably move upon the spindle shaft or within the hub. Also, the hub may turn rotationally upon the spindle, or the shaft may turn within the hub wherein the hub may be stationary, as a housing. Further, the shaft position may be positioned axially with respect to the hub or housing.

Figure 19:
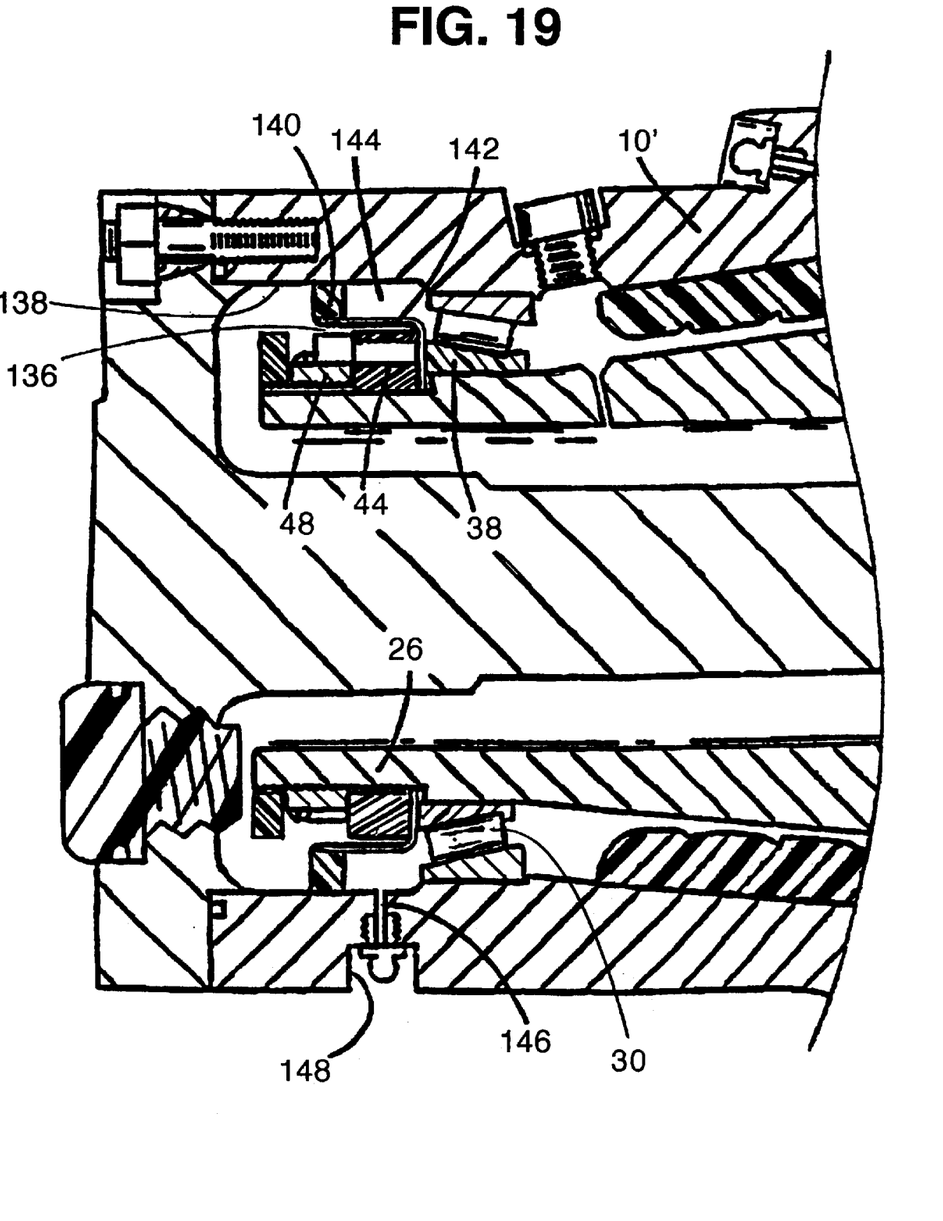
FIG. 19 is a fragmentary longitudinal view, similar to FIG. 12, showing an outer bearing sealing arrangement for a re-greasing hub.

My earlier U.S. Pat. No. 5,658,053 illustrates driven hub outer lubricant sealing arrangements. With reference to FIG. 19 herein, the configuration of calibrated nut 48 allows minimal outer nut radius, providing a substantial space 136 between the outer circumference of the nut and the outer hub bore 138. This space permits the installation of an outer lubricant seal 140 in bore 138. Seal 140 has an inner keyed disc 142 so fitted as to not rotate on spindle 26 and is axially positioned between the hub outer bearing inner race 38 and the keyed inverse vernier backing washer 44. This arrangement forms circumferential grease retaining cavity 144 for outer bearing 30. Grease passage 146 in hub 10 communicates with recessed greasing port 148 and circumferential grease retaining cavity 144. This preferred arrangement of outer seal 140 substantially reduces the manufacturing cost and simplifies installation, while affording precision bearing adjustment.

It will be apparent to those skilled in the art that various changes may be made in the size, shape, type, number and arrangement of parts described hereinbefore, without departing from the spirit of this invention and the scope of the appended claims.

I claim:

1. A system for adjusting end play of a bearing interposed between relatively rotatable members one of which includes a threaded section and traversing keyway and the other of which has an abutment for securing the bearing, the system comprising:

a) a backing washer configured to abut said bearing and having a key projecting into said keyway, and b) a calibrated nut having threads configured to receive said threaded section and arranged to abut the side of the backing washer opposite said bearing, c) one of said backing washer and calibrated nut having circumferentially spaced calibration openings and the other of said backing washer and calibrated nut having circumferential openings spaced apart to distances different from the spacings between said calibration openings, whereby to provide vernier adjustment of said calibrated nut.

2. The system of claim 1 including lock means removably interengaging said backing washer and calibration nut for securing them together in the position of rotational adjustment of the calibrated nut.

3. The system of claim 2 wherein the lock means comprises a pin configured for reception in aligned ones of said openings in said backing washer and calibrated nut.

4. The system of claim 2 including retainer means removably interengaging the calibrated nut and lock means for securing the lock means against removal.

5. The system of claim 4 wherein the retainer means comprises a resilient split ring engageable removably in a groove in the calibrated nut and configured for engagement by the lock means when in said securing position.

6. The system of claim 5 wherein the lock means pin and retainer means resilient spaced ring are separate components.

7. The system of claim 5 wherein the lock means pin and retainer means resilient spaced ring are secured together as an integral unit.

8. The system of claim 1 including distance measuring means for measuring the relative movement between said relatively movable members, for determining the spacing between a bearing and the member movable relative thereto.

9. The system of claim 1 wherein the backing washer has vernier openings therein and the calibrated nut has openings therein cooperating with the vernier openings.

10. The system of claim 9 wherein the openings in the backing washer are inward of the outer circumference thereof.

11. The system of claim 9 wherein the openings in the backing washer extend inward from the outer circumference thereof.

12. The system of claim 1 wherein the openings in the calibrated nut extend inward from the outer circumference thereof and are configured to removably receive a tool for rotating the nut.

13. The system of claim 12 wherein the tool is a spanner type wrench.

14. The system of claim 1 including sensor stator means mounted removably on the member having the threaded section, sensor status means mounted for rotation with the rotatable member and spaced from the sensor stator means by an air gap, and data processor means for measuring the dimension of said air gap.

15. The system of claim 1 including sensor stator means mounted removably on the member having the threaded section, sensor status means mounted for rotation with the rotatable member and spaced from the sensor stator means by an air gap, and data processor means for measuring the dimension of said air gap, and vibration characteristics.

16. The system of claim 1 wherein the backing washer has vernier openings therein and the calibrated nut has openings therein cooperating with the vernier openings, the openings in the calibrated nut extend inward from the outer circumference thereof and are configured to removably receive a tool for rotating the nut, and distance measuring means for measuring the relative movement between said relatively movable members, for determining the spacing between a bearing and the member movable relative thereto.

17. The system of claim 16 wherein the distance measuring means comprises sensor stator means mounted removably on the member having the threaded section, sensor status means mounted for rotation with the rotatable member and spaced from the sensor stator means by an air gap, and data processor means for measuring the dimension of said air gap.

18. The system of claim 16 wherein the distance measuring means comprises sensor stator means mounted removably on the member having the threaded section, sensor status means mounted for rotation with the rotatable member and spaced from the sensor stator means by an air gap, and data processor means for measuring the dimension of said air gap and vibration characteristics.

* * * * *